United States Patent
Chen et al.

(10) Patent No.: US 11,190,451 B2
(45) Date of Patent: Nov. 30, 2021

(54) PACKET TRANSMISSION METHOD AND NETWORK DEVICE

(71) Applicant: HUAWEI TECHNOLOGIES CO., LTD., Shenzhen (CN)

(72) Inventors: Lihao Chen, Beijing (CN); Mingui Zhang, Boulogne Billancourt (FR)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 146 days.

(21) Appl. No.: 16/727,133

(22) Filed: Dec. 26, 2019

(65) Prior Publication Data

US 2020/0136977 A1 Apr. 30, 2020

Related U.S. Application Data

(63) Continuation of application No. PCT/CN2018/090195, filed on Jun. 7, 2018.

(30) Foreign Application Priority Data

Jun. 29, 2017 (CN) .......................... 201710514960.3

(51) Int. Cl.
*H04L 12/819* (2013.01)
*H04L 12/803* (2013.01)
(Continued)

(52) U.S. Cl.
CPC .......... *H04L 47/215* (2013.01); *H04L 47/122* (2013.01); *H04L 47/14* (2013.01); *H04L 47/00* (2013.01)

(58) Field of Classification Search
CPC ....... H04L 47/14; H04L 47/00; H04L 47/122; H04L 47/215
(Continued)

(56) References Cited

U.S. PATENT DOCUMENTS

| | | | |
|---|---|---|---|
| 6,868,062 B1 | 3/2005 | Yadav et al. | |
| 7,746,777 B2 * | 6/2010 | Brown | G06F 9/5011 370/230.1 |

(Continued)

FOREIGN PATENT DOCUMENTS

| | | |
|---|---|---|
| CN | 102238068 A | 11/2011 |
| CN | 102664807 A | 9/2012 |

(Continued)

OTHER PUBLICATIONS

Leymann et al., "Huawei's GRE Tunnel Bonding Protocol", Independent Submission Request for Comments: 8157, May 2017, total 44 pages.

(Continued)

*Primary Examiner* — Rownak Islam
(74) *Attorney, Agent, or Firm* — Maier & Maier, PLLC

(57) ABSTRACT

A method for transmitting packets includes: determining, by a transmitting device based on a length of a packet, whether a quantity of tokens in a first token bucket meets a requirement for transmitting the packet, where a token injection rate of the first token bucket is set based on bandwidth of a first link. If the quantity of tokens in the first token bucket meets the requirement for transmitting the packet, a quantity of tokens required for transmitting the packet is obtained, and the packet is transmitted using the first link. If the quantity of tokens in the first token bucket does not meet the requirement for transmitting the packet, determining whether a second link is congested. If the second link is not in a congested state, the transmitting device transmits the packet by using the second link.

14 Claims, 3 Drawing Sheets

(51) Int. Cl.
*H04L 12/801* (2013.01)
*H04L 12/70* (2013.01)

(58) Field of Classification Search
USPC .......................................... 370/235
See application file for complete search history.

(56) References Cited

U.S. PATENT DOCUMENTS

| | | | |
|---|---|---|---|
| 2003/0174649 A1* | 9/2003 | Shankar | H04L 12/2898 370/235 |
| 2015/0016266 A1* | 1/2015 | Dumitrescu | H04L 47/215 370/236 |
| 2015/0063121 A1* | 3/2015 | Nadas | H04L 47/125 370/237 |
| 2016/0380884 A1 | 12/2016 | Sarikaya et al. | |

FOREIGN PATENT DOCUMENTS

| | | |
|---|---|---|
| CN | 102984081 A | 3/2013 |
| CN | 103701721 A | 4/2014 |
| CN | 105939283 A | 9/2016 |
| CN | 105939285 A | 9/2016 |
| EP | 2667662 A1 | 11/2013 |
| WO | 2016/128931 A1 | 8/2016 |

OTHER PUBLICATIONS

J. You et al., "Traffic Distribution for GRE Tunnel Bonding draft-you-traffic-distribution-for-bonding-00", Network Working Group Internet-Draft, Mar. 21, 2016, total 8 pages.

* cited by examiner

PACKET TRANSMISSION METHOD AND NETWORK DEVICE

CROSS-REFERENCE TO RELATED APPLICATIONS

This application is a continuation of International Application No. PCT/CN2018/090195, filed on Jun. 7, 2018, which claims priority to Chinese Patent Application No. 201710514960.3, filed on Jun. 29, 2017. The disclosures of the aforementioned applications are hereby incorporated by reference in their entireties.

TECHNICAL FIELD

An exemplary embodiment relates to the field of communications technologies, and in particular, to a packet transmission method and a network device.

BACKGROUND

In a scenario in which a user can access a network by using two links at the same time, a token bucket is usually used at a transmitting device to determine a link for transmitting a packet. For example, in a hybrid access (HA) technology, the user may use a fixed network and a mobile network of an operator at the same time. The HA technology can significantly improve access bandwidth of the user and improve access reliability. To implement HA technology, a token bucket is usually used at a transmitting device to determine whether a packet is transmitted using a fixed-bandwidth network or a mobile network. In other words, a token injection rate of the token bucket at the transmitting device may be determined based on bandwidth of the fixed network. If a quantity of tokens currently included in the token bucket is less than a length of the packet, it indicates that a quantity of packets exceeds a receiving capability of the token bucket, and the packet is labeled "yellow", or if the quantity of tokens currently included in the token bucket is greater than or equal to the length of the packet, the packet is labeled "green". Then the packet labeled "yellow" is transmitted through the mobile network, and the packet labeled "green" is transmitted through the fixed network.

In a token injection operation, the token injection rate of the token bucket is a packet flow limiting rate expected by the user. A system usually sets the token injection rate to bandwidth committed by the fixed network, and therefore the injection rate of the token bucket remains unchanged. Even if a link to the fixed network is congested, but a link to the mobile network is in an idle state, a token is still injected into the token bucket based on the specified bandwidth of the fixed network, so that the token bucket still labels a packet with a packet length less than the quantity of tokens green, and transmits the packet using the link to the fixed network. Therefore, a packet is still allocated to the congested link for transmission, but the other link is idle, and consequently, traffic cannot be properly offloaded in a case of a traffic burst, and network load is imbalanced.

SUMMARY

Embodiments provide a packet transmission method and a network device to implement proper packet offloading and ensure that link bandwidth is fully used. In an exemplary case of a traffic burst, in the foregoing method load sharing can still be performed on packets based on a link priority to relieve link transmission pressure.

According to a first aspect, a packet transmission method is provided, where the method is applied to a network including a first link and a second link. The method includes: first, determining, by a transmitting device based on a length of a packet, whether a quantity of tokens in a first token bucket meets a requirement for transmitting the packet, where a token injection rate of the first token bucket is set based on bandwidth of the first link; when determining that the quantity of tokens in the first token bucket meets the requirement for transmitting the packet, obtaining, by the transmitting device, a quantity of tokens required for transmitting the packet, and transmitting the packet by using the first link; when determining that the quantity of tokens in the first token bucket does not meet the requirement for transmitting the packet, further determining, by the transmitting device, whether the second link is congested; and when determining that the second link is not in a congested state, transmitting, by the transmitting device, the packet by using the second link.

After offloading packets by using a token bucket mechanism, the transmitting device further determines, by determining whether a link is congested, a link for sending the packet, to avoid sending the packet to a congested path, thus reducing packet loss.

With reference to the first aspect, in a first possible implementation, before the determining, by a transmitting device based on a length of a packet, whether a quantity of tokens in a first token bucket meets a requirement for transmitting the packet, the method further includes:

determining, based on the length of the packet, whether a quantity of tokens in a second token bucket meets the requirement for transmitting the packet, where a token injection rate of the second token bucket is set based on bandwidth of the second link;

when the quantity of tokens in the second token bucket meets the requirement for transmitting the packet, obtaining the quantity of tokens required for transmitting the packet, and transmitting the packet by using the second link; and correspondingly, the determining, by a transmitting device based on a length of a packet, whether a quantity of tokens in a first token bucket meets a requirement for transmitting the packet includes:

when the quantity of tokens in the second token bucket does not meet the requirement for transmitting the packet, determining, by the transmitting device based on the length of the packet, whether the quantity of tokens in the first token bucket meets the requirement for transmitting the packet.

In the foregoing solution, a first token bucket mechanism is set for the first link and a second token bucket mechanism is set for the second link, so that the transmitting device can determine a status of each link and determine, based on a determining result, a preferable link for sending the packet, to ensure that link bandwidth is fully used.

With reference to the first aspect, in a second possible implementation, the method further includes:

transmitting, by the transmitting device, the packet by using the first link when determining that the second link is in a congested state.

The transmitting device determines that the second link is in a congested state, and this indicates that the second link is not suitable for transmitting the packet. If the packet is still sent to the second link, packet loss is caused. Therefore, the packet may be sent using the first link, to reduce the packet loss.

With reference to the first aspect, in a third possible implementation, the transmitting, by the transmitting device, the packet by using the first link when determining that the second link is in a congested state includes:

when determining that the second link is in a congested state, further determining, by the transmitting device, whether the first link is in a congested state; and transmitting, by the transmitting device, the packet by using the first link when determining that the first link is not in a congested state.

In the foregoing solution, before sending the packet to the first link, the transmitting device needs to further determine whether the first link is congested, to avoid sending the packet when the first link is congested, thereby reducing the packet loss.

With reference to the first aspect, in a fourth possible implementation, the transmitting, by the transmitting device, the packet by using the second link when determining that the second link is not in a congested state includes:

when a quantity of flight packets transmitted on the second link is less than a flight packet threshold, determining, by the transmitting device, that the second link is not in a congested state, where the quantity of flight packets is a sum of bytes of packets that are being transmitted on the second link and for which the transmitting device does not receive an acknowledgment message, where the acknowledgment message is a message that is sent when the packets are received by a receiving device of the second link and are correctly sorted to the transmitting device to acknowledge that the packets are received, and where the flight packet threshold is a threshold that is set based on a quantity of packets that can be accommodated by the second link.

In the foregoing solution, the quantity of flight packets and the flight packet threshold are used to determine whether a link is congested, thereby ensuring that packets that exceed a transmission capability of the first link continue to be offloaded based on a priority, to ensure that the link bandwidth can be fully used. The flight packet threshold is set to avoid, in a dynamic condition, a phenomenon that the second link still needs to transmit the packet in a congested state.

With reference to the first aspect, in a fifth possible implementation, the transmitting the packet by using the first link when determining that the second link is in a congested state includes:

when a quantity of flight packets transmitted on the second link is greater than or equal to a flight packet threshold, determining, by the transmitting device, that the second link is in a congested state, where the quantity of flight packets is a sum of bytes of packets that are being transmitted on the second link and for which the transmitting device does not receive an acknowledgment message, where the acknowledgment message is a message that is sent when the packets are received by a receiving device of the second link and are correctly sorted to the transmitting device to acknowledge that the packets are received, and where the flight packet threshold is a threshold that is set based on a quantity of packets that can be accommodated by the second link.

With reference to the first aspect, in a sixth possible implementation, the first link is a link of a fixed-bandwidth network, and the second link is a link of a mobile network; or the first link is a link of a mobile network, and the second link is a link of a fixed network.

By using the foregoing solution, a user can access the fixed network and the mobile network at the same time, so that access bandwidth of the user is significantly improved, and a network access probability is increased.

According to a second aspect, an embodiment provides a network device for packet transmission, where the network device is applied to a network including a first link and a second link, and the network device includes a first determining unit, a second determining unit, an obtaining unit, and a sending unit.

The first determining unit is configured to determine, based on a length of a packet, whether a quantity of tokens in a first token bucket meets a requirement for transmitting the packet, where a token injection rate of the first token bucket is set based on bandwidth of the first link.

The second determining unit is configured to: when it is determined that the quantity of tokens in the first token bucket does not meet the requirement for transmitting the packet, further determine whether the second link is congested.

The obtaining unit is configured to: when it is determined that the quantity of tokens in the first token bucket meets the requirement for transmitting the packet, obtain a quantity of tokens required for transmitting the packet.

The sending unit is configured to: when it is determined that the quantity of tokens in the first token bucket meets the requirement for transmitting the packet, send the packet by using the first link. The sending unit is further configured to: when it is determined that the second link is not in a congested state, send the packet by using the second link.

With reference to the second aspect, in a first possible implementation, the network device further includes a third determining unit.

The third determining unit is configured to: before determining whether the quantity of tokens in the first token bucket meets the requirement for transmitting the packet based on the length of the packet, determine, based on the length of the packet, whether a quantity of tokens in a second token bucket meets the requirement for transmitting the packet, where a token injection rate of the second token bucket is set based on bandwidth of the second link.

The obtaining unit is further configured to: when the quantity of tokens in the second token bucket meets the requirement for transmitting the packet, obtain the quantity of tokens required for transmitting the packet.

The sending unit is further configured to: when the quantity of tokens in the second token bucket meets the requirement for transmitting the packet, send the packet by using the second link.

With reference to the second aspect, in a second possible implementation, the sending unit is further configured to: when it is determined that the second link is in a congested state, send the packet by using the first link.

With reference to the second aspect, in a third possible implementation, the network device further includes a fourth determining unit.

The fourth determining unit is configured to: when it is determined that the second link is in a congested state, further determine whether the first link is in a congested state.

The sending unit is configured to: when it is determined that the first link is not in a congested state, send the packet by using the first link.

With reference to the second aspect, in a fourth possible implementation, the second determining unit is configured to: when a quantity of flight packets transmitted on the second link is less than a flight packet threshold, determine that the second link is not in a congested state, where the quantity of flight packets is a sum of bytes of packets that are being transmitted on the second link and for which the network device does not receive an acknowledgment message, where the acknowledgment message is a message that is sent when the packets are received by a receiving device of the second link and are correctly sorted to the network device to acknowledge that the packets are received, and where the flight packet threshold is a threshold that is set based on a quantity of packets that can be accommodated by the second link.

With reference to the second aspect, in a fifth possible implementation, the second determining unit is configured to: when a quantity of flight packets transmitted on the second link is greater than or equal to a flight packet threshold, determine that the second link is in a congested state, where the quantity of flight packets is a sum of bytes of packets that are being transmitted on the second link and for which the network device does not receive an acknowledgment message, where the acknowledgment message is a message that is sent when the packets are received by a receiving device of the second link and are correctly sorted to the network device to acknowledge that the packets are received, and where the flight packet threshold is a threshold that is set based on a quantity of packets that can be accommodated by the second link.

According to a third aspect, an embodiment provides a computer readable storage medium, and the computer readable storage medium stores an instruction. When the instruction runs on a computer, the computer is enabled to perform the method described in the first aspect, the second aspect, and the possible implementations.

According to a fourth aspect, an embodiment provides a network device, and the network device includes a network interface, a processor, a memory, and a bus that connects the network interface, the processor, and the memory. The memory is configured to store a program, an instruction, or code. The processor is configured to execute the program, the instruction, or the code in the memory, to perform the method described in the first aspect, the second aspect, and the possible implementations.

DESCRIPTION OF EMBODIMENTS

The following further describes in detail the embodiments with reference to the accompanying drawings.

Figure 1:
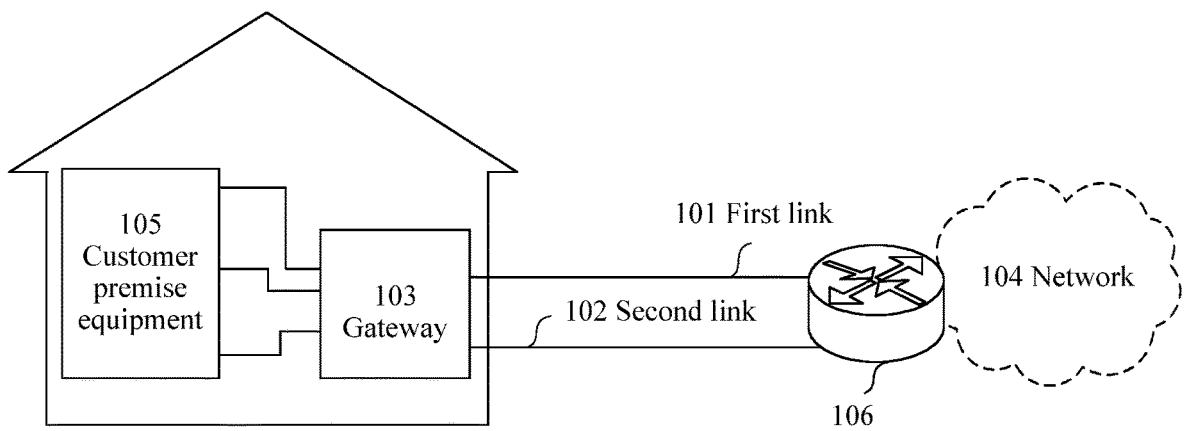
FIG. 1 is a schematic diagram of an application scenario according to an embodiment.

FIG. 1 is a schematic diagram of an architecture of a packet transmission. The architecture includes customer premise equipment 105, a gateway 103, a first link 101, a second link 102, a network 104, and a hybrid access aggregation node 106. The customer premise equipment 105 may be a telephone set, a personal computer, a network access server, or the like. The gateway 103 may be a home gateway and is a user-side network device that can enable the customer premise equipment 105 to access the network 104. The gateway 103 may be a device such as a router or a switch, and the aggregation node 106 may also be a device such as a router or a switch. The first link 101 may be a link to the access network 104 that is provided by a mobile operator for the customer premise equipment 105, and the second link may be a link to the access network 104 that is provided by a fixed network operator. In other words, the customer premise equipment 105 may access the network 104 by using the first link 101 provided by the mobile operator, for example, the customer premise equipment 105 may access the network 104 by using long term evolution (LTE). The customer premise equipment 105 may also access the network 104 by using the second link 102 provided by the fixed network operator, for example, the customer premise equipment 105 may access the network 104 by using a digital subscriber line (DSL). The gateway 103 may select either the first link 101 to send a packet to the network 104 or the second link 102 to send a packet to the network 104. Similarly, the hybrid access aggregation node 106 may select either the first link 101 to send a packet to the customer premise equipment 105 or the second link 102 to send a packet to the customer premise equipment 105. When determining whether to send a packet by using the first link 101 or the second link 102, the gateway 103 and the hybrid access aggregation node 106 may determine, based on a token bucket coloring mechanism, a link used for transmitting the packet.

When the gateway 103 or the hybrid access aggregation node 106 determines, by using the token bucket coloring mechanism, the link for sending the packet, an injection rate of the token bucket is set based on bandwidth of the first link 101 or the second link 102. In other words, a value of the injection rate of the token bucket is set based on bandwidth committed by an operator. For example, the injection rate of the token bucket may be set to half of a value of bandwidth committed by the fixed network operator. A new token is injected into the token bucket at the specified rate provided that the token bucket is not full of tokens. For example, a value of a token input rate is set based on the bandwidth of the first link. When the gateway 103 or the hybrid access aggregation node 106 needs to determine the link for sending the packet, the gateway 103 or the hybrid access aggregation node 106 may determine, based on a length of the packet, whether the token bucket has enough tokens, and transmit the packet by using the first link 101 if the token bucket has enough tokens, or transmit the packet by using the second link 102 if the token bucket does not have enough tokens. In the foregoing process of determining the link for sending the packet, whether the token bucket has enough tokens is determined based only on the length of the to-be-sent packet, and an actual condition of the link is not considered. Consequently, even if the first link 101 is congested, a token is still injected into the token bucket at the specified rate, and new tokens are unceasingly injected into the token bucket. Thus, the tokens in the token bucket may always meet the length of the to-be-transmitted packet, and even if the first link 101 for transmitting the packet is already in a congested state, the packet is still transmitted using the first link 101. Therefore, when the first link 101 is already congested, even if the second link 102 is in an idle state, the gateway 103 or the hybrid access aggregation node 106 still determines the link based on the quantity of tokens in the token bucket. In this example, a packet cannot be offloaded properly, and the first link 101 is greatly affected in a case of a traffic burst. It should be noted that the application scenario shown in FIG. 1 is merely an application scenario of one embodiment, and should not limit the application scenarios in other embodiments.

To resolve the foregoing technical problems, embodiments of the present invention provide a packet transmission method and a network device. The method and the network device are based on a similar inventive concept. Because the method and the network device are similar in a problem resolving principle, for implementation of the network device and the method, refer to each other. Repeated content is not described herein.

Figure 2:
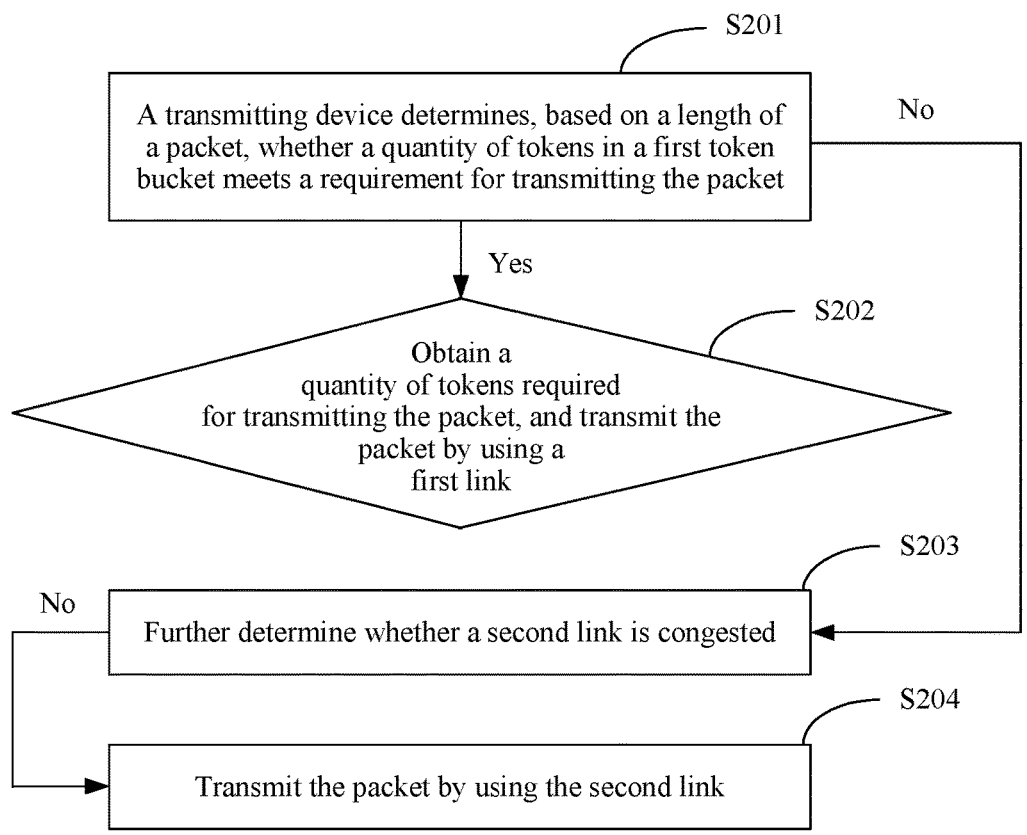
FIG. 2 is a schematic flowchart of a packet transmission method according to an embodiment.

Referring to FIG. 2, with reference to the network application scenario in FIG. 1, FIG. 2 provides a packet transmission method. A transmitting device in the method may be the gateway 103 or the hybrid access aggregation node 106 in FIG. 1. The method is applied to a network including a first link and a second link, and the method includes the following steps.

In step S201, the transmitting device determines, based on a length of a packet, whether a quantity of tokens in a first token bucket meets a requirement for transmitting the packet, where a token injection rate of the first token bucket is set based on bandwidth of the first link.

In an exemplary implementation, before the transmitting device sends the packet to a receiving device, the first token bucket is set at the transmitting device. When the gateway 103 in FIG. 1 sends a packet of the customer premise equipment 105 to the network 104, the gateway 103 is the transmitting device, and when the hybrid access aggregation node 106 sends a packet to the network 104, the hybrid access aggregation node 106 is the transmitting device. When the first token bucket is set at the transmitting device to implement packet coloring, the token injection rate of the first token bucket is set based on the bandwidth of the first link. The bandwidth of the first link is network bandwidth committed to a user by an operator that provides an access network service of the first link. For example, when the first link is provided by a fixed network operator to access a network, if a user accesses the network by a DSL, committed bandwidth allocated by the operator to the user is 10 megabytes per second (MB/s), and the token injection rate of the first token bucket may also be set to 10 MB/s. To avoid congestion on the DSL, the token injection rate of the first token bucket may alternatively be set to half of a value of the committed bandwidth; in other words, the token injection rate of the first token bucket is set to 5 MB/s. Certainly, the token injection rate of the first token bucket may be adjusted based on a required result, but an adjustment range needs to be determined based on the bandwidth of the first link. After the token injection rate of the first token bucket is determined, a token is injected into the first token bucket at the determined rate until the first token bucket is full. When the transmitting device receives the packet, the transmitting device determines, based on the length of the packet, whether the quantity of tokens in the first token bucket meets the requirement for transmitting the packet, in other words, the transmitting device determines the length of the packet and the quantity of tokens in the first token bucket.

In step S202, when determining that the quantity of tokens in the first token bucket meets the requirement for transmitting the packet, the transmitting device obtains a quantity of tokens required for transmitting the packet and transmits the packet by using the first link.

In an exemplary implementation, if the quantity of tokens in the first token bucket is greater than or equal to a quantity of tokens required for the length of the packet, the transmitting device may determine that the quantity of tokens in the first token bucket meets the requirement for transmitting the packet. After determining that the quantity of tokens in the first token bucket meets the requirement for transmitting the packet, the transmitting device is allowed to obtain, from the first token bucket, the quantity of tokens that meet the length of the packet, and transmits the packet by using the first link.

For example, when determining that the quantity of tokens in the first token bucket is greater than or equal to the requirement for transmitting the packet, the transmitting device colors the packet green, and obtains, from the first token bucket, the quantity of tokens that meet the length of the packet, and the transmitting device transmits the green packet by using the first link.

In step S203, when determining that the quantity of tokens in the first token bucket does not meet the requirement for transmitting the packet, the transmitting device further determines whether the second link is congested.

In an exemplary implementation, the first link is a link provided by a fixed network operator to access a network, and the second link is a link provided by a mobile operator to access a network. If the quantity of tokens in the first token bucket is less than the quantity of tokens required by the length of the packet, the transmitting device may determine that the quantity of tokens in the first token bucket does not meet the requirement for transmitting the packet. In this case, it indicates that the packet is not suitable for being transmitted using a link of a fixed network. Before considering transmitting the packet by using a link provided by a mobile network, whether the link provided by the mobile network is congested needs to be further determined.

In another exemplary implementation, the first link is a link provided by a mobile operator to access a network, and the second link is a link provided by a fixed operator to access a network. If the quantity of tokens in the first token bucket is less than the quantity of tokens required by the length of the packet, the transmitting device may determine that the quantity of tokens in the first token bucket does not meet the requirement for transmitting the packet, and this indicates that the packet is not suitable for being transmitted by using a link of a mobile network. Before transmitting the packet by using a link provided by a fixed network, whether the fixed network is in a congested state is further determined. In another implementation, it may be understood that the first link and the second link in this embodiment are links provided by any operator to access a network. The first link and the second link may be network links provided by a same operator, or may be network links provided by different operators.

For example, the first link is a DSL and the second link is LTE. When determining that the quantity of tokens in the first token bucket is less than the requirement for transmitting the packet, the transmitting device colors the packet red, indicating that the red packet is not suitable for being transmitted using the DSL. Before transmitting the red packet by using the LTE, the transmitting device needs to further determine whether the LTE is congested.

In step S204, when determining that the second link is not in a congested state, the transmitting device transmits the packet by using the second link.

In an exemplary implementation, when determining that the second link is not in a congested state, the transmitting device may transmit the packet by using the second link.

For example, if the transmitting device determines that the second link is not in a congested state, the transmitting device may color the packet red, and transmit the red packet by using the second link.

In the foregoing solution, the token injection rate of the first token bucket is set based on the bandwidth of the first link. When determining that the quantity of tokens in the first token bucket can meet the requirement for transmitting the packet, the transmitting device transmits the packet by using the first link. When determining that the quantity of tokens in the first token bucket cannot meet the requirement for transmitting the packet, the transmitting device continues to determine a congested state of the second link. If the transmitting device determines that the second link is not in a congested state, the transmitting device may transmit the packet by using the second link, to avoid packet loss that occurs when the transmitting device continues to transmit the packet by using the second link when the second link is in a congested state.

In an exemplary implementation, that the transmitting device transmits the packet by using the second link when determining that the second link is not in a congested state includes: When a quantity of flight packets transmitted on the second link is less than a flight packet threshold, the transmitting device determines that the second link is not in a congested state. The quantity of flight packets is a sum of bytes of packets that are being transmitted on the second link and for which the transmitting device does not receive an acknowledgment message. The acknowledgment message is a message that is sent, when the packets are received by a receiving device of the second link and are correctly sorted, to the transmitting device to acknowledge that the packets are received. The flight packet threshold is a threshold that is set based on a quantity of packets that can be accommodated by the second link.

In this exemplary implementation, when it is determined whether the second link is in a congested state, whether the second link is congested may be determined by determining the quantity of flight packets transmitted on the second link and the flight packet threshold. The quantity of flight packets is the sum of the bytes of the packets that are being transmitted on the second link and for which the transmitting device does not receive the acknowledgment message. The acknowledgement message is the message that is sent when the packets are received by the receiving device of the second link and are correctly sorted to the transmitting device to acknowledge that the packets are received. The flight packet threshold is the threshold that is set based on the quantity of packets that can be accommodated by the second link. When the quantity of flight packets is less than the flight packet threshold, the transmitting device may determine that the second link is not in a congested state.

For example, after the transmitting device sends a packet and before a reordering buffer at the receiving device correctly sorts the packet, when packet loss is not considered, the packet may exist in the following locations on the second link: a transmission path of a tunnel of the second link, a buffer of a network device on the second link, the reordering buffer at the receiving device, and the like. The quantity of flight packets is a sum of bytes of packets that are sent by the transmitting device at any moment but for which the transmitting device has not received an acknowledgement message including a corresponding acknowledgement number (ACK), for example, a sum of bytes of packets transmitted on the second link, packets in the buffer of the network device on the second link, and packets in the reordering buffer on the second link. To obtain the quantity of the flight packets of the second link, a sequence number and a length of each packet sent by using the second link may be recorded at the transmitting device. After receiving an acknowledgement message sent by the receiving device, the transmitting device deletes, based on an ACK carried in the acknowledgement message, a packet sequence number that is recorded at the transmitting device and that corresponds to the ACK. In this case, a sum obtained by adding packet lengths corresponding to remaining sequence numbers recorded at the transmitting device is the quantity of flight packets of the second link. The flight packet threshold may be set based on the following information: a transmission delay of the second link, bandwidth of the second link, and buffer space of a network device on a physical link. Setting a maximum value of the quantity of packets that can be accommodated by the second link is setting a threshold of a packet transmitted on the second link. For example, the flight packet threshold may be set to a value less than a value of a mathematical expression: $d \times c + B$, where d is a one-way delay value of the second link, c is a bandwidth value of the second link, and B is a value of total buffer space of the network device on the second link. The mathematical expression expresses a maximum value of packets that can be accommodated on one way of the second link. The quantity of flight packets and a value of the flight packet threshold are compared, so that whether the second link is in a congested state can be determined. If the quantity of flight packets is less than the flight packet threshold, the transmitting device may determine that the second link is not in a congested state.

In the foregoing method, the transmitting device compares the quantity of flight packets of the second link with the flight packet threshold, to determine whether the second link is congested, so that a real-time state in which the bandwidth of the second link is used can be determined more accurately. Therefore, in a dynamic condition, it can be avoided to continue transmitting the packet when the second link is in a congested state, the bandwidth of the first link and the bandwidth of the second link can be fully used, and load sharing is performed on packets based on a link priority.

In an exemplary implementation, the transmitting, by the transmitting device, the packet by using the first link when determining that the second link is congested includes: When determining that the second link is in a congested state, the transmitting device further determines whether the first link is in a congested state; and when determining that the first link is not in a congested state, the transmitting device transmits the packet by using the first link.

In an exemplary implementation, the sending the packet to the first link for transmission when determining that the second link is in a congested state includes: When a quantity of flight packets transmitted on the second link is greater than or equal to a flight packet threshold, the transmitting device determines that the second link is in a congested state. The quantity of flight packets is a sum of bytes of packets that are being transmitted on the second link and for which the transmitting device does not receive an acknowledgment message. The acknowledgment message is a message that is sent, when the packets are received by a receiving device of the second link and are correctly sorted, to the transmitting device to acknowledge that the packets are received. The flight packet threshold is a threshold that is set based on a quantity of packets that can be accommodated by the second link.

In this exemplary implementation, how to determine whether the second link is in a congested state is described in detail in the foregoing embodiment. If it is determined that the quantity of flight packets of the second link is greater than or equal to the flight packet threshold of the second link, it may be determined that the second link is in a congested state. In this case, because it is determined that the second link is in a congested state, the packet may be transmitted by using the first link.

In an exemplary implementation, after determining that the second link is in a congested state, the transmitting device transmits the packet by using the first link, and the method further includes: when determining that the second link is in a congested state, the transmitting device further determines whether the first link is in a congested state. When determining that the first link is not in a congested state, the transmitting device transmits the packet by using the first link.

In this exemplary implementation, after determining that the second link is in a congested state and before transmitting the packet by using the first link, the transmitting device performs congestion determining on the first link. An exemplary congestion determining technique may be the congestion determining technique for the second link in the foregoing embodiment, and details are not described herein again. After determining that the first link is not in a congested state, the transmitting device transmits the packet by using the first link.

Figure 3:
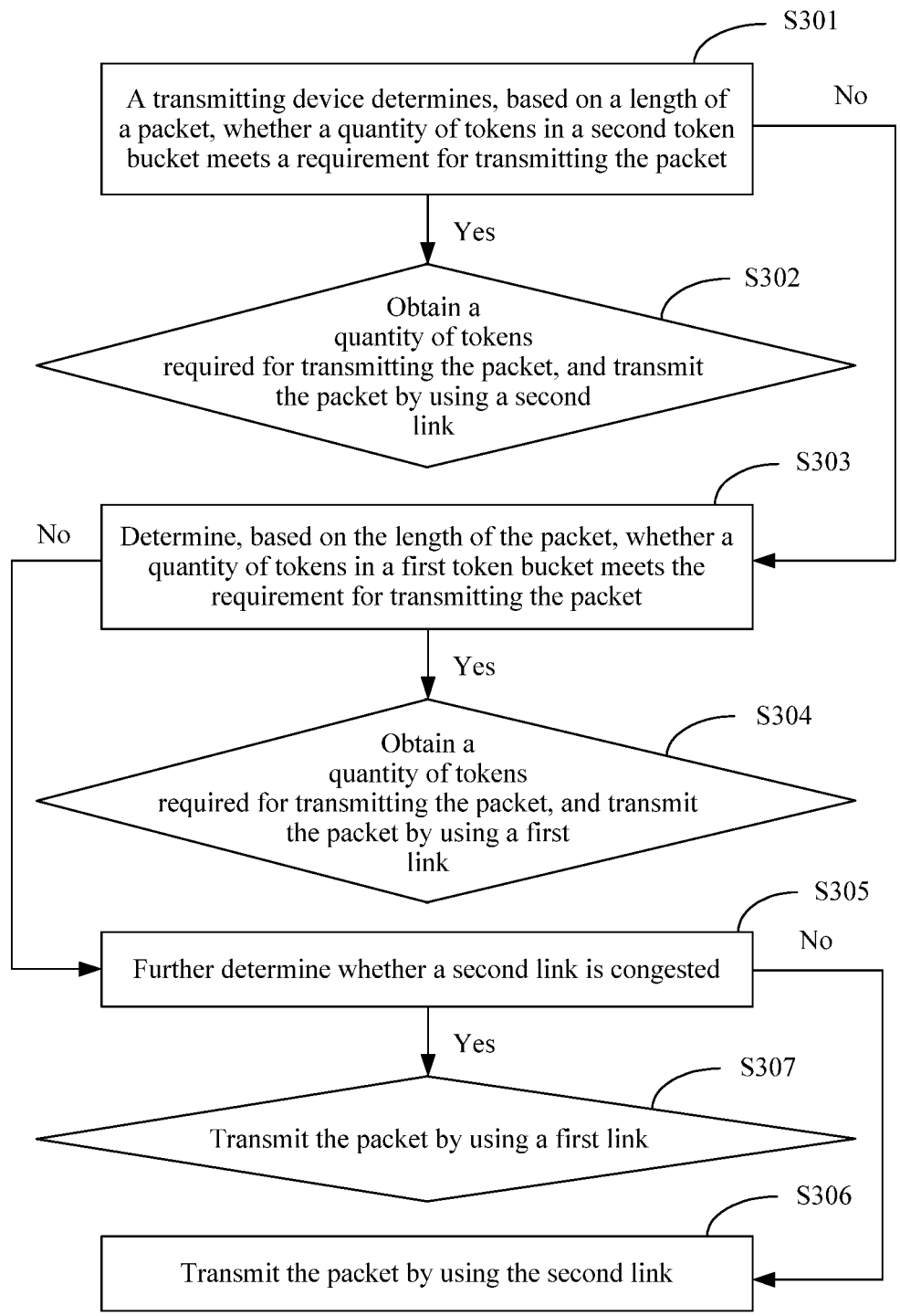
FIG. 3 is a schematic flowchart of another packet transmission method according to an embodiment.

Referring to FIG. 3, an embodiment provides a packet transmission method. With reference to a network scenario in FIG. 1, a transmitting device in this embodiment may be the gateway 103 or the hybrid access aggregation node 106 in FIG. 1, or the transmitting device in FIG. 2. A first token bucket in this embodiment may be the first token bucket in FIG. 2. A first link in this embodiment may be the first link 101 in FIG. 1 or may be the first link in FIG. 2. The method is also applied to a network including a first link and a second link, and the method includes the following steps.

In step S301, the transmitting device determines, based on a length of a packet, whether a quantity of tokens in a second token bucket meets a requirement for transmitting the packet, where a token injection rate of the second token bucket is set based on bandwidth of the second link.

In an exemplary implementation, two token bucket mechanisms are set at the transmitting device, and the two token bucket mechanisms respectively correspond to two links. For example, a token injection rate of a first token bucket is set based on bandwidth of the first link, and the token injection rate of the second token bucket is set based on the bandwidth of the second link. For setting of an injection rate of a token bucket, refer to the method described in step S201. Details are not described herein again. The transmitting device first determines, based on the length of the packet, whether the quantity of tokens in the second token bucket meets the requirement for transmitting the packet, where the token injection rate of the second token bucket is set based on the bandwidth of the second link.

For example, when the first link is a DSL and the second link is LTE, the transmitting device sets the token injection rate of the second token bucket based on bandwidth of the LTE, and after receiving the packet, the transmitting device determines, based on the length of the packet, whether the quantity of tokens in the second token bucket meets the requirement for transmitting the packet. A person of ordinary skill in the art may understand that the first link may be LTE, and the second link may be a DSL. The transmitting device may also set the token injection rate of the second token bucket based on bandwidth of the DSL, and before sending the packet, the transmitting device determines, based on the length of the packet, whether the quantity of tokens in the second token bucket meets the requirement for transmitting the packet.

In step S302, when determining that the quantity of tokens in the second token bucket meets the requirement for transmitting the packet, the transmitting device obtains a quantity of tokens required for transmitting the packet, and transmits the packet by using the second link.

In an exemplary implementation, if the quantity of tokens in the second token bucket is greater than or equal to the quantity of tokens required for transmitting the length of the packet, a quantity of tokens equal to that used for transmitting the packet are obtained, and the packet is transmitted by using the second link.

For example, when the first link is LTE and the second link is a DSL, if the quantity of tokens in the second token bucket is greater than or equal to the quantity of tokens required for transmitting the length of the packet, the packet may be colored red, the quantity of tokens equal to that used for transmitting the packet are obtained, and the red packet is transmitted by the DSL.

In step S303, when determining that the quantity of tokens in the second token bucket does not meet the requirement for transmitting the packet, the transmitting device determines, based on the length of the packet, whether a quantity of tokens in the first token bucket meets the requirement for transmitting the packet, where the token injection rate of the first token bucket is set based on the bandwidth of the first link.

In an exemplary implementation, when determining that the quantity of tokens in the second token bucket is less than the requirement for transmitting the packet, the transmitting device continues to determine the packet by using the first token bucket, and a value of the token injection rate of the first token bucket is set based on the bandwidth of the first link.

For example, when the first link is LTE and the second link is a DSL, if the quantity of tokens in the second token bucket is less than the quantity of tokens required for transmitting the length of the packet, it indicates that the packet is not suitable for being transmitted by using the DSL, the packet may be colored green, and the green packet is not transmitted by using the DSL. The green packet still needs to be determined by using the first token bucket, and the token injection rate of the first token bucket is set based on bandwidth of the LTE.

In step S304, when determining that the quantity of tokens in the first token bucket meets the requirement for transmitting the packet, the transmitting device obtains a quantity of tokens required for transmitting the packet, and transmits the packet by using the first link.

In an exemplary implementation, if the transmitting device determines that the quantity of tokens in the first token bucket can meet the requirement for transmitting the packet, the transmitting device obtains, from the token bucket, a quantity of tokens that are equal to the length of the packet, and transmits the packet by using the first link.

For example, when the first link is LTE and the second link is a DSL, the transmitting device may color a packet that does not meet a transmission requirement of the DSL green, and then continue to determine the green packet by using the first token bucket. When determining that the quantity of tokens in the first token bucket meet a requirement for transmitting the green packet, the transmitting device transmits the green packet by using the LTE.

In step S305, when determining that the quantity of tokens in the first token bucket does not meet the requirement for transmitting the packet, the transmitting device determines whether the second link is congested.

In an exemplary implementation, when determining that the quantity of tokens in the first token bucket does not meet the requirement for transmitting the packet, the transmitting device further determines whether the second link is congested. Whether the second link is congested may be determined in a conventional means of a person skilled in the art, or whether the second link is congested may be determined based on the method in step S204 described in the method in FIG. 2. Thus, whether the second link is in a congested state may be determined by using the quantity of flight packets of the second link and the flight packet threshold. For an exemplary implementation method, refer to step S204. For brevity, details are not described herein again.

For example, when the first link is LTE and the second link is a DSL, the transmitting device colors green a packet that is determined, by using the second token bucket, to be not suitable for being transmitted by using the DSL, and continues to determine the green packet by using the first token bucket. When determining that the quantity of tokens in the first token bucket does not meet the requirement for transmitting the packet, the transmitting device may color the packet red, and before transmitting the red packet by using the DSL, determines a link status of the DSL, and further determines whether the DSL is congested.

In step S306, when determining that the second link is not in a congested state, the transmitting device transmits the packet by using the second link.

In an exemplary implementation, if the second link is not in a congested state, the second link may be used for transmitting the packet, and the transmitting device may transmit the packet by using the second link.

For example, when the first link is LTE and the second link is a DSL, the transmitting device may send the packet by using the DSL when determining that the DSL is not in a congested state.

In step S307, when determining that the second link is in a congested state, the transmitting device transmits the packet by using the first link.

In an exemplary implementation, when determining that the second link is in a congested state, it indicates that the second link is not suitable for transmitting the packet, and therefore, the transmitting device may transmit the packet by using the first link, to avoid packet loss caused when the packet is sent by using the second link.

In the foregoing solution, the transmitting device sets the token injection rate of the first token bucket based on the bandwidth of the first link and sets the token injection rate of the second token bucket based on the bandwidth of the second link. The transmitting device first determines, based on the length of the packet, whether the token injection rate of the second token bucket meets the requirement for transmitting the packet. If the quantity of tokens in the second token bucket meets the requirement for transmitting the packet, it indicates that the second link is suitable for sending the packet, and the packet may be transmitted using the second link. If the transmitting device determines that the quantity of tokens in the second token bucket does not meet the requirement for transmitting the packet, the transmitting device continues to determine whether the quantity of tokens in the first token bucket can meet the requirement for transmitting the packet, to determine whether the packet is suitable for being transmitted by using the first link. If the transmitting device determines that the quantity of tokens in the first token bucket meets the requirement for transmitting the packet, the transmitting device transmits the packet by using the first link. If the transmitting device determines that the quantity of tokens in the first token bucket cannot meet the requirement for transmitting the packet, it indicates that the first link is not suitable for transmitting the packet, and the transmitting device continues to determine whether the second link is congested. If the transmitting device determines that the second link is not in a congested state, the transmitting device transmits the packet by using the second link. In this way, the transmitting device may determine, level by level, priorities of links used for transmitting packets, to properly offload the packets. Therefore, it is ensured that bandwidth can be fully used, and through congestion determining, the packet can also be avoided from being sent to a congested link, thereby reducing packet loss.

Figure 4:
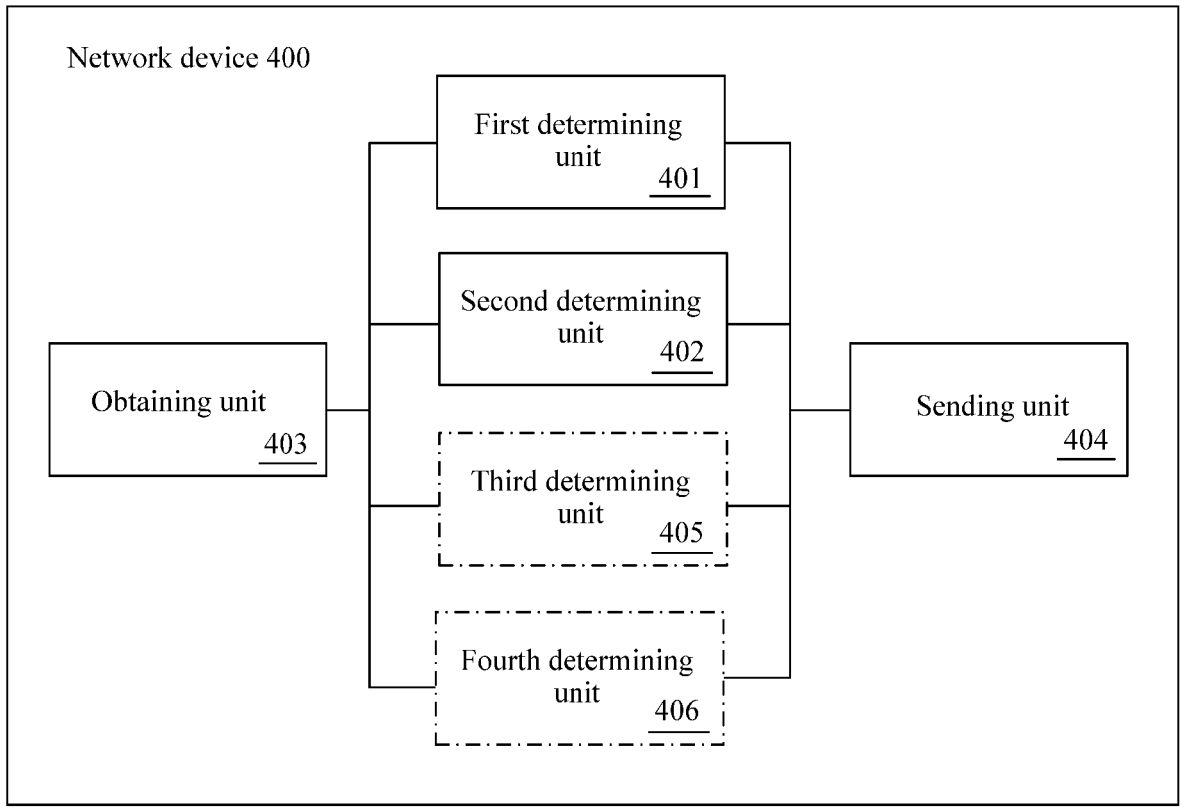
FIG. 4 shows a network device for packet transmission according to an embodiment.

Referring to FIG. 4, an embodiment provides a network device 400 for packet transmission, and the network device 400 is applied to a network including a first link and a second link. With reference to a network scenario in FIG. 1, a transmitting device in this embodiment may be the gateway 103 or the hybrid access aggregation node 106 in FIG. 1. The network device 400 may perform steps and functions of the transmitting device in the methods described in FIG. 2 and FIG. 3, and the network device 400 includes a first determining unit 401, a second determining unit 402, an obtaining unit 403, and a sending unit 404.

The first determining unit 401 is configured to determine, based on a length of a packet, whether a quantity of tokens in a first token bucket meets a requirement for transmitting the packet, where a token injection rate of the first token bucket is set based on bandwidth of the first link.

The second determining unit 402 is configured to: when it is determined that the quantity of tokens in the first token bucket does not meet the requirement for transmitting the packet, further determine whether the second link is congested.

The obtaining unit 403 is configured to: when it is determined that the quantity of tokens in the first token bucket meets the requirement for transmitting the packet, obtain a quantity of tokens required for transmitting the packet.

The sending unit 404 is configured to: when it is determined that the quantity of tokens in the first token bucket meets the requirement for transmitting the packet, send the packet by using the first link. The sending unit 404 is further configured to: when it is determined that the second link is not in a congested state, send the packet by using the second link.

In an exemplary implementation, for an exemplary implementation of the first determining unit 401, the second determining unit 402, the obtaining unit 403, and the sending unit 404, refer to related functions and steps of the transmitting device in the methods described in FIG. 2 and FIG. 3. For brevity, details are not described herein again.

In an exemplary implementation, the network device 400 further includes a third determining unit 405.

The third determining unit 405 is configured to: before determining whether the quantity of tokens in the first token bucket meets the requirement for transmitting the packet based on the length of the packet, determine, based on the length of the packet, whether a quantity of tokens in a second token bucket meets the requirement for transmitting the packet. A token injection rate of the second token bucket is set based on bandwidth of the second link.

The obtaining unit 403 is further configured to: when the quantity of tokens in the second token bucket meets the requirement for transmitting the packet, obtain the quantity of tokens required for transmitting the packet.

The sending unit 404 is further configured to: when the quantity of tokens in the second token bucket meets the requirement for transmitting the packet, send the packet by using the second link.

In an exemplary implementation, the sending unit 404 is further configured to: when it is determined that the second link is in a congested state, send the packet by using the first link.

In an exemplary implementation, the network device further includes a fourth determining unit 406.

The fourth determining unit 406 is configured to: when it is determined that the second link is in a congested state, further determine whether the first link is in a congested state.

The sending unit 404 is further configured to: when it is determined that the first link is not in a congested state, send the packet by using the first link.

In an exemplary implementation, the second determining unit 402 is configured to: when a quantity of flight packets transmitted on the second link is less than a flight packet threshold, determine, by the transmitting device, that the second link is not in a congested state. The quantity of flight packets is a sum of bytes of packets that are being transmitted on the second link and for which the transmitting device does not receive an acknowledgment message. The acknowledgment message is a message that is sent when the packets are received by a receiving device of the second link and are correctly sorted to the transmitting device to acknowledge that the packets are received. The flight packet threshold is a threshold that is set based on a quantity of packets that can be accommodated by the second link.

In an exemplary implementation, the second determining unit 402 is configured to: when a quantity of flight packets transmitted on the second link is greater than or equal to a flight packet threshold, determine that the second link is in a congested state. The quantity of flight packets is a sum of bytes of packets that are being transmitted on the second link and for which the transmitting device does not receive an acknowledgment message. The acknowledgment message is a message that is sent, when the packets are received by a receiving device of the second link and are correctly sorted, to the transmitting device to acknowledge that the packets are received. The flight packet threshold is a threshold that is set based on a quantity of packets that can be accommodated by the second link.

In an exemplary implementation, the first link is a link of a fixed-bandwidth network, and the second link is a link of a mobile network; or the first link is a link of a mobile network, and the second link is a link of a fixed network.

Figure 5:
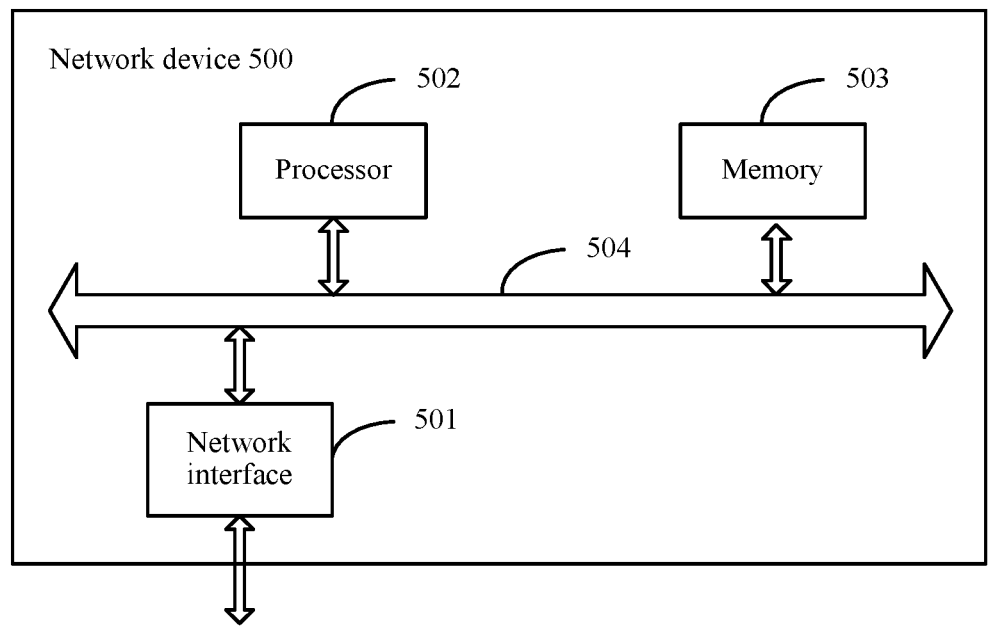
FIG. 5 shows another network device for packet transmission according to an embodiment.

Referring to FIG. 5, an embodiment provides another network device 500 for packet transmission, and the network device 500 is applied to a network including a first link and a second link. The network device shown in FIG. 5 may be the gateway 103 in FIG. 1, may be the hybrid access aggregation node 106, or may be the transmitting device in the methods described in FIG. 2 and FIG. 3, and can implement functions of the transmitting device. As shown in FIG. 5, the network device includes a network interface 501, a processor 502, a memory 503, and various buses 504 that connect the processor 502, the memory 503, and the network interface 501.

The processor 502 includes but is not limited to one or more of a central processing unit (CPU), a network processor (NP), an application-specific integrated circuit (ASIC), and a programmable logic device (PLD). The PLD may be a complex programmable logic device (CPLD), a field-programmable gate array (FPGA), generic array logic (GAL) device, or any combination thereof.

The network interface 501 may be a wired interface, such as a fiber distributed data interface (FDDI) or an Ethernet interface. The network interface 501 may alternatively be a wireless interface, such as a wireless local area network interface.

The memory 503 may include but is not limited to a content-addressable memory (CAM), such as a ternary content-addressable memory (TCAM), or a random access memory (RAM).

The memory 503 may alternatively be integrated into the processor 502. If the memory 503 and the processor 502 are components independent of each other, the memory 503 is connected to the processor 502, for example, the memory 503 may communicate with the processor 502 by using the bus. The network interface 501 and the processor 502 may communicate by using the bus, or the network interface 501 may be directly connected to the processor 502.

In an exemplary implementation, the processor 502 is configured to: determine, based on a length of a packet, whether a quantity of tokens in a first token bucket meets a requirement for transmitting the packet, where a token injection rate of the first token bucket is set based on bandwidth of the first link; and when determining that the quantity of tokens in the first token bucket meets the requirement for transmitting the packet, obtain a quantity of tokens required for transmitting the packet; or when determining that the quantity of tokens in the first token bucket does not meet the requirement for transmitting the packet, further determine whether the second link is congested.

The network interface 501 is configured to: when the transmitting device determines that the quantity of tokens in the first token bucket meets the requirement for transmitting the packet, transmit the packet by using the first link; and when the transmitting device determines that the second link is not in a congested state, transmit the packet by using the second link.

In this exemplary implementation, for an exemplary implementation of the processor 502 and the network interface 501, refer to functions and implementation steps of the transmitting device in the method described in FIG. 2. For brevity, details are not described herein again.

In another exemplary implementation, the processor 502 is configured to: determine, based on a length of a packet, whether a quantity of tokens in a second token bucket meets a requirement for transmitting the packet, where a token injection rate of the second token bucket is set based on bandwidth of the second link; when the transmitting device determines that the quantity of tokens in the second token bucket meets the requirement for transmitting the packet, obtain a quantity of tokens required for transmitting the packet; when the transmitting device determines that the quantity of tokens in the second token bucket does not meet the requirement for transmitting the packet, determine, based on the length of the packet, whether a quantity of tokens in a first token bucket meets the requirement for transmitting the packet, where a token injection rate of the first token bucket is set based on bandwidth of the first link; when the transmitting device determines that the quantity of tokens in the first token bucket meets the requirement for transmitting the packet, obtain the quantity of tokens required for transmitting the packet; and when the transmitting device determines that the quantity of tokens in the first token bucket does not meet the requirement for transmitting the packet, further determine whether the second link is congested.

The network interface 501 is configured to: when the transmitting device determines that the quantity of tokens in the first token bucket meets the requirement for transmitting the packet, transmit the packet by using the first link; when the transmitting device determines that the second link is not in a congested state, transmit the packet by using the second link; and when the transmitting device determines that the second link is in a congested state, transmit the packet by using the first link.

In this exemplary implementation, for exemplary implementation of the processor 502 and the network interface 501, refer to functions and implementation steps of the transmitting device shown in FIG. 3, and for a method for determining whether the second link is congested, refer to the method described in step S204 in FIG. 2. For brevity, details are not described herein again.

For other additional functions that can be implemented by the network device 500 and a process of interacting with another device, refer to descriptions of the functions and execution steps of the transmitting device in the method embodiments described in FIG. 2 and FIG. 3. Details are not described herein again.

It may be clearly understood by a person skilled in the art that, for the purpose of convenient and brief description, for a detailed working process of the foregoing apparatus and unit, refer to a corresponding process in the foregoing method embodiments. Details are not described herein again.

It should be understood that sequence or step numbers of the foregoing methods do not mean execution sequences in various embodiments. The execution sequence of the methods should be determined based on functions and internal logic of the method, and should not be construed as any limitation on an implementation process of the embodiments.

In the several embodiments provided, it should be understood that the disclosed method and device may be implemented by other means. For example, the described apparatus embodiment is merely illustrative. For example, the module division is merely logical function division and may be other division in actual implementation. For example, a plurality of modules or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The modules described as separate parts may or may not be physically separate, and parts displayed as modules may or may not be physical units, may be located in one position, or may be distributed on a plurality of network units. Some or all of the units may be selected based on actual requirements to achieve the objectives of the solutions of the embodiments.

In addition, functional modules in the embodiments of the present invention may be integrated into one processing unit, or each of the modules may exist alone physically, or two or more modules are integrated into one module. The integrated module may be implemented in a form of hardware, or may be implemented in a form of hardware in addition to a software functional unit.

When the integrated unit is implemented in a form of hardware in combination with software, and is sold or used as an independent product, the software may be stored in a computer readable storage medium. Based on such an understanding, in the technical solutions of the present invention, some technical features contributing to the prior art may be implemented in a form of a software product. The computer software product is stored in a storage medium, and includes some instructions for instructing a computer device (which may be a personal computer, a server, a network device, or the like) to perform all or some of the steps of the methods described in the embodiments of the present invention. The storage medium may be a USB flash disk, a removable hard disk, a read-only memory (ROM), a random access memory (RAM), a magnetic disk, or a compact disc.

The invention claimed is:

1. A packet transmission method, wherein the method is applied to a network comprising a first link and a second link, the method comprising:
   determining, by a transmitting device based on a length of a packet, whether a quantity of tokens in a first token bucket meets a requirement for transmitting the packet, wherein a token injection rate of the first token bucket is set based on a bandwidth of the first link;
   if the quantity of tokens in the first token bucket meets the requirement for transmitting the packet, obtaining, by the transmitting device, a quantity of tokens required for transmitting the packet, and transmitting the packet by using the first link;
   if the quantity of tokens in the first token bucket does not meet the requirement for transmitting the packet, further determining, by the transmitting device, whether the second link is in a congested state; and
   if the second link is not in the congested state, transmitting, by the transmitting device, the packet by using the second link.

2. The method according to claim 1, wherein before determining, by the transmitting device based on the length of the packet, whether the quantity of tokens in the first token bucket meets the requirement for transmitting the packet, the method further comprises:
   determining, based on the length of the packet, whether a quantity of tokens in a second token bucket meets the requirement for transmitting the packet, wherein a token injection rate of the second token bucket is set based on a bandwidth of the second link; and
   if the quantity of tokens in the second token bucket meets the requirement for transmitting the packet, obtaining the quantity of tokens required for transmitting the packet, and transmitting the packet by using the second link; and
   if the quantity of tokens in the second token bucket does not meet the requirement for transmitting the packet, determining, by the transmitting device based on the length of the packet, whether the quantity of tokens in the first token bucket meets the requirement for transmitting the packet.

3. The method according to claim 1, wherein the method further comprises:
   transmitting, by the transmitting device, of the packet by using the first link when determining that the second link is in the congested state.

4. The method according to claim 3, wherein the transmitting, by the transmitting device, of the packet by using the first link when determining that the second link is in the congested state comprises:
   if the second link is in the congested state, further determining, by the transmitting device, whether the first link is in a congested state; and
   transmitting, by the transmitting device, the packet by using the first link if the first link is not in the congested state.

5. The method according to claim 1, wherein the transmitting, by the transmitting device, of the packet by using the second link if the second link is not in the congested state comprises:

if a quantity of flight packets transmitted on the second link is less than a flight packet threshold, determining, by the transmitting device, that the second link is not in the congested state, wherein the quantity of flight packets is a sum of bytes of packets that are being transmitted on the second link and before the transmitting device receives an acknowledgment message, wherein the acknowledgment message is a message that is sent, when the packets are received by a receiving device of the second link and are correctly sorted, to the transmitting device to acknowledge that the packets are received, and the flight packet threshold is a threshold that is set based on a quantity of packets that can be accommodated by the second link.

6. The method according to claim 3, wherein the transmitting of the packet by using the first link if the second link is in the congested state comprises:
if a quantity of flight packets transmitted on the second link is greater than or equal to a flight packet threshold, determining, by the transmitting device, that the second link is in the congested state, wherein the quantity of flight packets is a sum of bytes of packets that are being transmitted on the second link and before the transmitting device receives an acknowledgment message, wherein the acknowledgment message is a message that is sent, when the packets are received by a receiving device of the second link and are correctly sorted, to the transmitting device to acknowledge that the packets are received, and the flight packet threshold is a threshold that is set based on a quantity of packets that can be accommodated by the second link.

7. The method according to claim 1, wherein the first link is a link of a fixed-bandwidth network, and the second link is a link of a mobile network.

8. The method according to claim 1, wherein the first link is a link of a mobile network, and the second link is a link of a fixed network.

9. A network device for packet transmission, comprises:
a network interface for transmitting a packet;
a processor; and
a non-transitory computer readable storage medium storing a program to be executed by the processor, the program including instructions for:
determining, based on a length of the packet, whether a quantity of tokens in a first token bucket meets a requirement for transmitting the packet, wherein a token injection rate of the first token bucket is set based on a bandwidth of a first link;
if the quantity of tokens in the first token bucket meets the requirement for transmitting the packet, obtaining, by the network device, a quantity of tokens required for transmitting the packet, and transmitting the packet by using the first link;
if the quantity of tokens in the first token bucket does not meet the requirement for transmitting the packet, further determining, by the network device, whether a second link is in a congested state; and if the second link is not in the congested state, transmitting, by the network device, the packet by using the second link.

10. The network device according to claim 9, wherein the program includes instructions for:
before determining if the quantity of tokens in the first token bucket meets the requirement for transmitting the packet based on the length of the packet, determining, based on the length of the packet, whether a quantity of tokens in a second token bucket meets the requirement for transmitting the packet, wherein a token injection rate of the second token bucket is set based on a bandwidth of the second link;
if the quantity of tokens in the second token bucket meets the requirement for transmitting the packet, obtaining the quantity of tokens required for transmitting the packet and sending the packet by using the second link.

11. The network device according to claim 9, wherein
if the second link is in the congested state, sending the packet by using the first link.

12. The network device according to claim 11, wherein
if the second link is in the congested state, further determining whether the first link is in a congested state; and
if the first link is not in the congested state, sending the packet by using the first link.

13. The network device according to claim 9, wherein
if a quantity of flight packets transmitted on the second link is less than a flight packet threshold, determining that the second link is not in the congested state, wherein the quantity of flight packets is a sum of bytes of packets that are being transmitted on the second link and before the network device receives an acknowledgment message, wherein the acknowledgment message is a message that is sent, when the packets are received by a receiving device of the second link and are correctly sorted, to the network device to acknowledge that the packets are received, and the flight packet threshold is a threshold that is set based on a quantity of packets that can be accommodated by the second link.

14. The network device according to claim 11, wherein
if a quantity of flight packets transmitted on the second link is greater than or equal to a flight packet threshold, determining that the second link is in the congested state, wherein the quantity of flight packets is a sum of bytes of packets that are being transmitted on the second link and before the network device receives an acknowledgment message, wherein the acknowledgment message is a message that is sent, when the packets are received by a receiving device of the second link and are correctly sorted, to the network device to acknowledge that the packets are received, and the flight packet threshold is a threshold that is set based on a quantity of packets that can be accommodated by the second link.

* * * * *